US009823672B2

(12) United States Patent
McCurnin et al.

(10) Patent No.: US 9,823,672 B2
(45) Date of Patent: Nov. 21, 2017

(54) REMOTE APPLICATION FOR CONTROLLING AN HVAC SYSTEM

(71) Applicant: Honeywell International Inc., Morristown, NJ (US)

(72) Inventors: David J. McCurnin, Coon Rapids, MN (US); Patrick C. Tessier, Maple Grove, MA (US)

(73) Assignee: Honeywell International Inc., Morris Plains, NJ (US)

( * ) Notice: Subject to any disclaimer, the term of this patent is extended or adjusted under 35 U.S.C. 154(b) by 1392 days.

(21) Appl. No.: 13/691,378

(22) Filed: Nov. 30, 2012

(65) Prior Publication Data

US 2014/0151456 A1 Jun. 5, 2014

(51) Int. Cl.
*F24F 11/00* (2006.01)
*G05D 23/19* (2006.01)

(52) U.S. Cl.
CPC ...... *G05D 23/1905* (2013.01); *F24F 11/0086* (2013.01); *F24F 2011/0068* (2013.01); *F24F 2011/0091* (2013.01)

(58) Field of Classification Search
CPC .............. G05D 23/1905; F24F 11/0086; F24F 11/0091
See application file for complete search history.

(56) References Cited

U.S. PATENT DOCUMENTS

| 7,548,197 B2 | 6/2009 | Gruchala et al. |
| 7,577,922 B2 | 8/2009 | Mann et al. |
| 7,617,197 B2 | 11/2009 | Stanton et al. |
| 7,624,114 B2 | 11/2009 | Paulus et al. |
| 7,860,901 B2 | 12/2010 | Cheng et al. |
| 9,088,812 B2 | 7/2015 | Calissendorff |

(Continued)

FOREIGN PATENT DOCUMENTS

| WO | WO 2012/079530 | 6/2012 |
| WO | WO 2012/097636 | 7/2012 |
| WO | WO 2012/102813 | 8/2012 |

OTHER PUBLICATIONS

Van Setten et al., "Context-Aware Recommendations in the Mobile Tourist Application Compass," 10 pages, downloaded Sep. 15, 2015.

(Continued)

*Primary Examiner* — Ljiljana Ciric
*Assistant Examiner* — Alexis Cox
(74) *Attorney, Agent, or Firm* — Seager, Tufte & Wickhem, LLP

(57) ABSTRACT

A wireless device used to communicate with and control one or more components of an HVAC system from a remote location is provided. The wireless device is configured to display two or more icons on the display of the device, wherein each icon executes a function that aids the user in controlling one or more components of the HVAC system. The wireless device dynamically orders the two or more icons on the display of the device, each according to a dynamic ranking algorithm. The dynamic ranking algorithm is based on a number of factors such as, for example, a relative frequency of selection of each of the two or more icons by a user, the current time of day, the current time of year, the current temperature, and/or the current location of the wireless device.

18 Claims, 11 Drawing Sheets

(56) References Cited

U.S. PATENT DOCUMENTS

| | | |
|---|---|---|
| 2004/0015575 A1* | 1/2004 | Motoyama ............ H04W 48/14 709/222 |
| 2007/0064477 A1 | 3/2007 | Dorow et al. |
| 2007/0130522 A1 | 6/2007 | Mansell et al. |
| 2009/0150938 A1 | 6/2009 | Clancy |
| 2010/0245259 A1* | 9/2010 | Bairagi ............. G05B 19/0423 345/173 |
| 2011/0072492 A1 | 3/2011 | Mohler et al. |
| 2011/0138328 A1 | 6/2011 | Ge et al. |
| 2011/0191611 A1 | 8/2011 | Boni Ang et al. |
| 2011/0252318 A1 | 10/2011 | Helms |
| 2012/0140255 A1 | 6/2012 | Tanaka |
| 2012/0179999 A1 | 7/2012 | Nesladek et al. |

OTHER PUBLICATIONS

"Cydia Updates That Matter," WordPress, 3 pages, Printed Jan. 31, 2013. cydiaupdates.wordpress.com/category/productivity/.

Bohmer et al., "Exploiting the Icon Arrangement on Mobile Devices as Information Source for Context-awareness," Munster University of Applied Sciences, 4 pages, Downloaded Aug. 2, 2012. ACM978-1-60558-835—Mar. 10, 2009.

vBulletin®, "Imgy Widgets," vBulletin Solutions Inc., 1 page, Downloaded Jul. 8, 2012. http://www.mobilephonetalk.com/archive/index.php/t-136530.html.

* cited by examiner

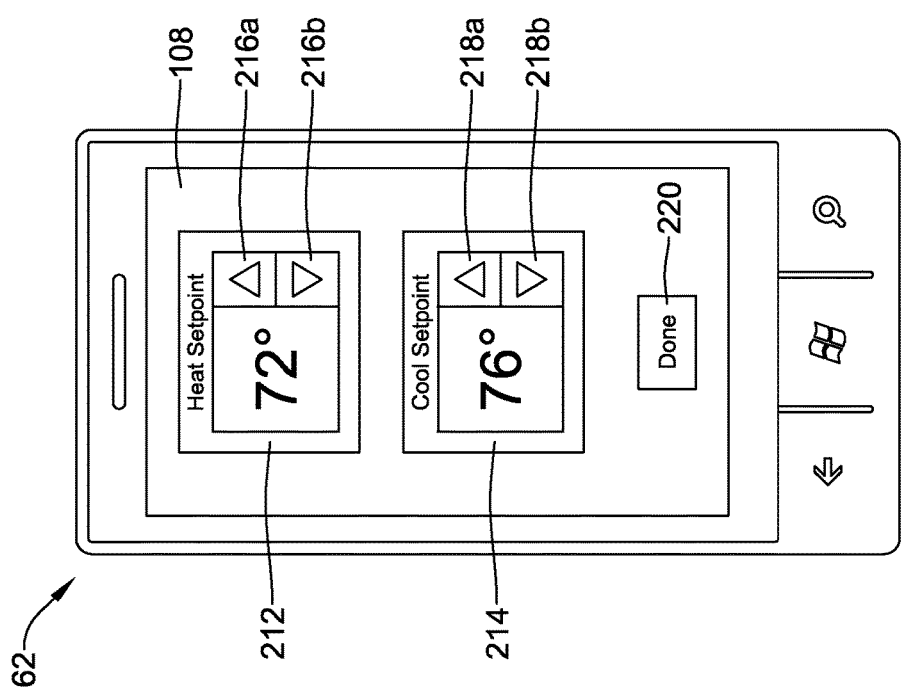

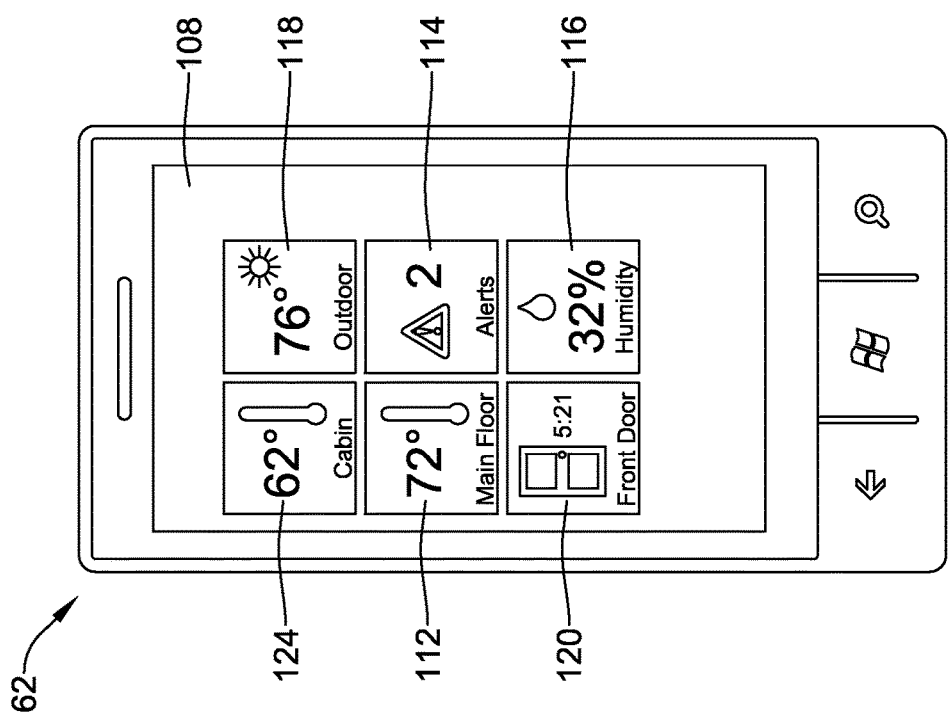

REMOTE APPLICATION FOR CONTROLLING AN HVAC SYSTEM

TECHNICAL FIELD

The present disclosure relates generally to HVAC systems, and more particularly to HVAC controllers that accommodate and/or facilitate control of an HVAC system from a remote location.

BACKGROUND

Heating, ventilation, and/or air conditioning (HVAC) systems are often used to control the comfort level within a building or other structure. Such HVAC systems typically include an HVAC controller that controls various HVAC components of the HVAC system in order to affect and/or control one or more environmental conditions within the building. In some cases, it may be desirable for a user to be able to affect the operation of an HVAC system from a remote location relative to the HVAC controller using, for example, a mobile wireless device.

SUMMARY

The present disclosure relates generally to HVAC systems, and more particularly to HVAC controllers that accommodate and/or facilitate control of an HVAC system from a remote location. In one illustrative embodiment, a wireless device configured to communicate with and help control one or more HVAC components of an HVAC system is provided. The wireless device may include a wireless interface for sending and receiving information, a memory, a user interface including a display, and a controller coupled to the wireless interface, the memory and the user interface. The controller may display two or more selectable icons on the display of the wireless device. Each of the two or more icons, when selected by a user, executes a unique function that aids the user in controlling the one or more HVAC components of the HVAC system. The unique function of each of the two or more icons may include displaying information received via the wireless interface and/or sending one or more commands to control the HVAC system via the wireless interface. The controller may further be configured to dynamically order the two or more icons on the display of the wireless device according to a dynamic ranking algorithm. In some instances, the dynamic ranking algorithm may be based on a number of factors including, for example, a relative frequency of selection of each of the two or more icons by a user, the current time of day, the current time of year, the current temperature, the current humidity, the current operating mode of the HVAC system, what HVAC equipment is currently active, the current location of the wireless device, and/or the like. Additionally, in some instance, the controller may be configured to not display at least one icon on the display when, for example, the particular function is not expected to be useful under the current operation conditions, the frequency of selection by a user does not meet a predetermined criteria, and/or for any other suitable reason.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
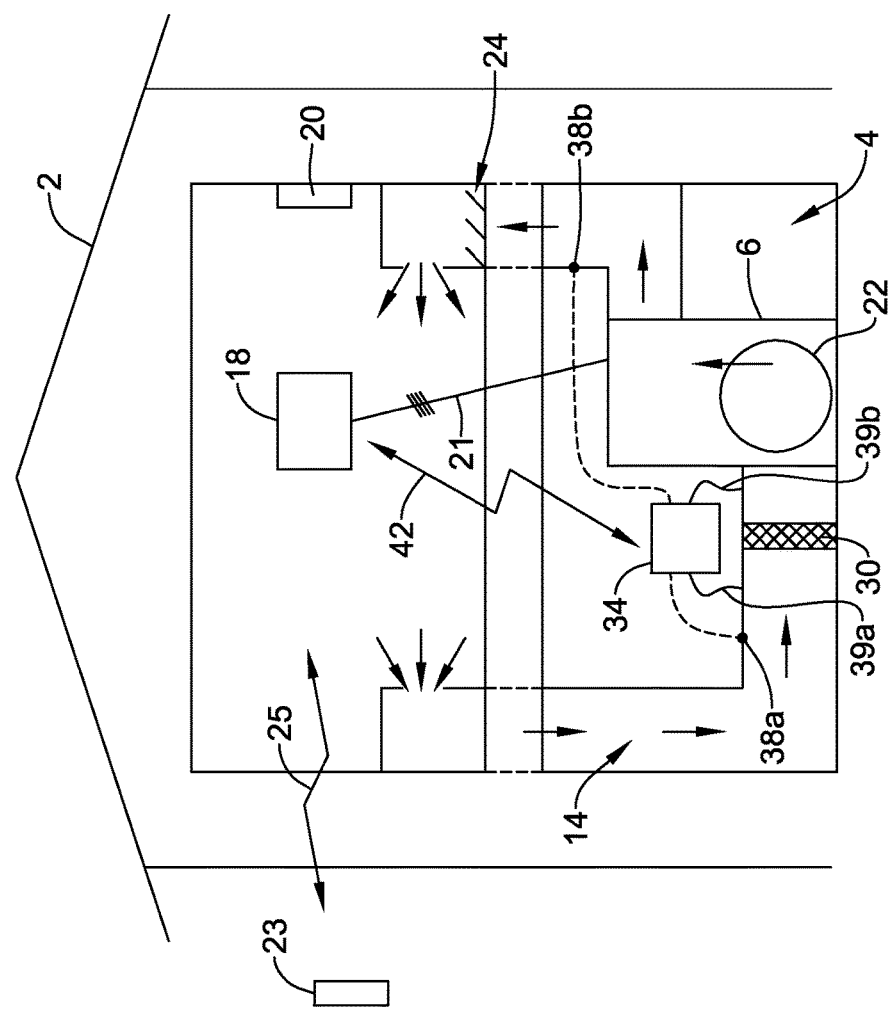
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several illustrative embodiments which are meant to be illustrative in nature.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 21. In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure.

An illustrative HVAC controller, which is not meant to be limiting in any way, is disclosed in: US Published Patent Application No. 20090140062, entitled "HVAC CONTROLLER THAT SELECTIVELY REPLACES OPERATING INFORMATION ON A DISPLAY WITH SYSTEM STATUS INFORMATION"; US Published Application No. 20090143880, entitled "HVAC CONTROLLER WITH CONTEXT SENSITIVE HELP SCREENS"; US Published Application No. 20090143918, entitled "METHOD AND APPARATUS FOR CONFIGURING AN HVAC CONTROLLER"; US Published Application No. 20090143916, entitled "HVAC CONTROLLER HAVING A PARAMETER ADJUSTMENT ELEMENT WITH A QUALITATIVE INDICATOR"; US Published Application No. 20090143879, entitled "HVAC CONTROLLER WITH PARAMETER CLUSTERING"; US Published Application No. 20090140056, entitled "HVAC CONTROLLER WITH QUICK SELECT FEATURE," the entireties of which are incorporated herein by reference for all purposes.

In some cases, the HVAC system 4 may include an internet gateway or other device 20 that may permit the HVAC controller 18, as described herein, to communicate over a wired or wireless network 25 with a remote device 23. In some cases, the network 25 may be a wireless local area network (WLAN) or a wide area network (WAN) such as, for example, the Internet. In some cases, the network 25 may include a cellular network. The remote device 23 may be used to communicate with and/or control the HVAC controller(s) 18 from a remote location, sometimes outside of and away from the building 2. The remote device 23 may be any one of a mobile phone including a smart phone, a PDA, a tablet computer, a laptop or personal computer, an e-Reader, and/or any other suitable device, as desired.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may be configured to measure or detect a change in a given parameter between the return air side and the discharge air side of the HVAC system 4. For example, the equipment interface module 34 may be adapted to measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating mode may be calculated by subtracting the return air temperature from the discharge air temperature (e.g. delta T=discharge air temp.−return air temp.). For the cooling mode, the delta T may be calculated by subtracting the discharge air temperature from the return air temperature (e.g. delta T=return air temp.−discharge air temp.).

In some cases, the equipment interface module 34 may include a first temperature sensor 38$a$ located in the return (incoming) air duct 14, and a second temperature sensor 38$b$ located in the discharge (outgoing or supply) air duct 10. Alternatively, or in addition, the equipment interface module 34 may include a differential pressure sensor including a first pressure tap 39$a$ located in the return (incoming) air duct 14, and a second pressure tap 39$b$ located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In either cases, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Figure 2:
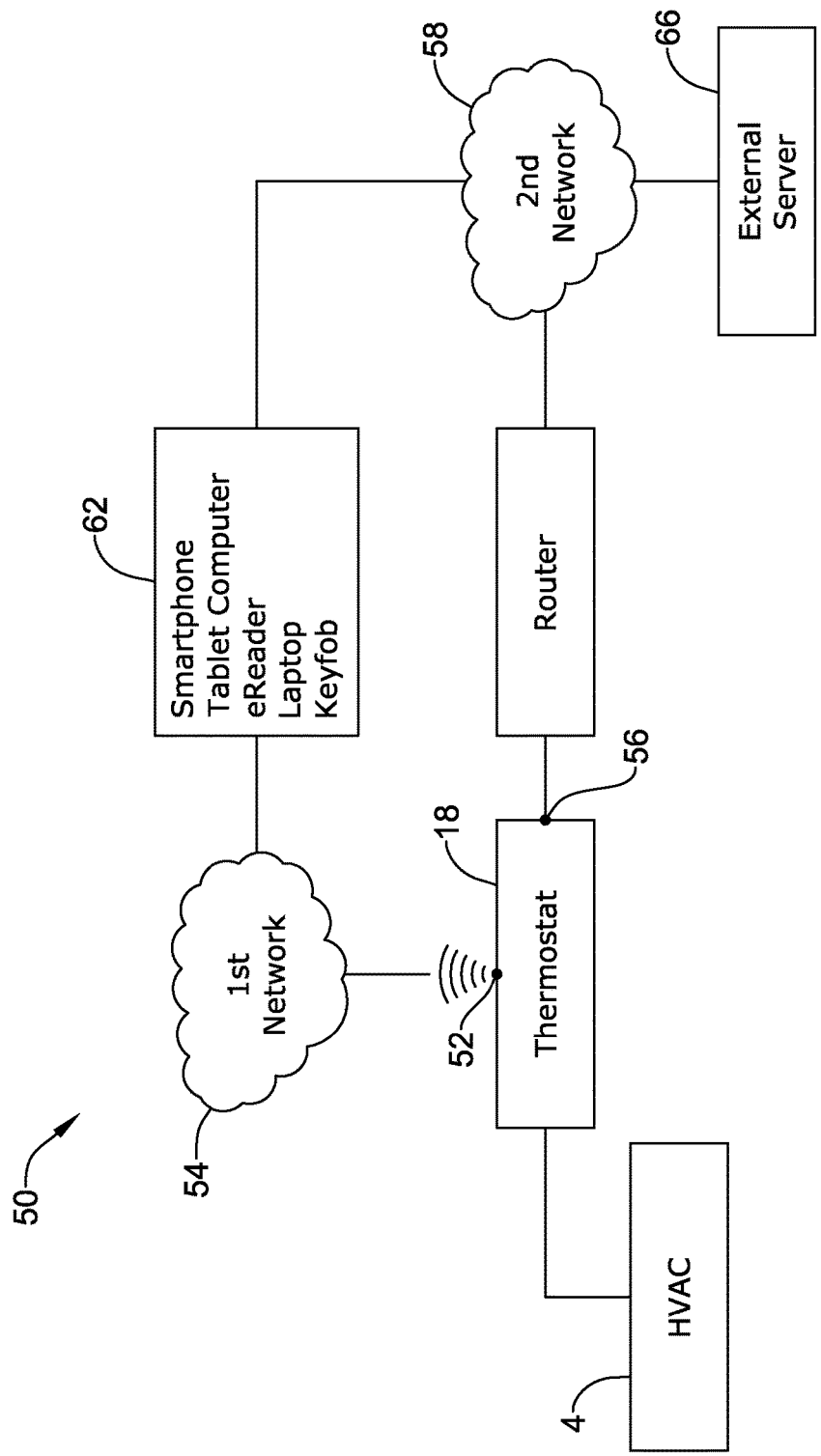
FIG. 2 is a schematic view of an illustrative HVAC control system that may facilitate access and/or control of the HVAC system of FIG. 1.

FIG. 2 is a schematic view of an HVAC control system 50 that may facilitate remote access and/or control of the HVAC system 4 shown in FIG. 1. The illustrative HVAC control system 50 includes an HVAC controller, such as for example, HVAC controller 18 (see FIG. 1) that is configured to communicate with and control one or more HVAC components 6 of the HVAC system 4 (see FIG. 1). As discussed above, the HVAC controller 18 may communicate with the one or more components 6 of the HVAC system 4 via a wired or wireless link. Additionally, the HVAC controller 18 may be configured to communicate over one or more wired or wireless networks that may accommodate remote access and/or control of the HVAC controller 18 via remote device including, but not limited to, mobile phones including smart phones, PDAs, tablet computers, laptop or personal computers, e-Readers, and/or the like.

In the example shown in FIG. 2, the HVAC controller 18 may include a first communications port 52 for communicating over a first network 54, and in some cases, a second communications port 56 for communicating over a second network 58. In some cases, the first network 54 may be a wireless local area network (LAN), and the second network 58 (when provided) may be a wide area network or global network (WAN) including, for example, the Internet. In some cases, the wireless local area network 54 may provide a wireless access point and/or a network host device that is separate from the HVAC controller 18. In other cases, the wireless local area network 54 may provide a wireless access point and/or a network host device that is part of the HVAC controller 18. In some cases, the wireless local area network 54 may include a local domain name server (DNS), but this is not required for all embodiments. Additionally, in some cases, the wireless local area network 54 may be an ad-hoc wireless network, but this is not required.

Depending upon the application and/or where the HVAC user is located, remote access and/or control of the HVAC controller 18 may be provided over the first network 54 and/or the second network 58. A variety of mobile wireless devices 62 may be used to access and/or control the HVAC controller 18 from a remote location (e.g. remote from HVAC Controller 18) over the first network 54 and/or second network 58 including, but not limited to, mobile phones including smart phones, PDAs, tablet computers, laptop or personal computers, e-Readers, and/or the like. In many cases, the mobile wireless devices 62 may be configured to communicate wirelessly over the first network 54 and/or second network 58 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, the HVAC controller 18 may be programmed to communicate over the second network 58 with an external web service hosted by one or more external web servers 66. A non-limiting example of such an external web service is Honeywell's TOTAL CONNECT™ web service, available from Honeywell International, Inc. The HVAC controller 18 may be configured to upload selected data via the second network 58 to the external web service where it may be collected and stored on the external web server 66. In some cases, the data may be indicative of the performance, current operating mode, current sensed temperature, current setpoint, and/or other information related to the operation of the HVAC system 4. Additionally, the HVAC controller 18 may be configured to receive and/or download selected data, settings and/or services including software updates from the external web service over the second network 58. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature set points, humidity set points, start times, end times, schedules, window frost protection settings, and/or the like. In some instances, the HVAC controller 18 may be configured to receive one or more user profiles having at least one operational parameter setting that is selected by and reflective of a user's preferences. Additionally, the HVAC controller 18 may be configured to receive local weather data, weather alerts and/or warnings, major stock index ticker data, and/or news headlines over the second network 58. These are just some examples.

Figure 3:
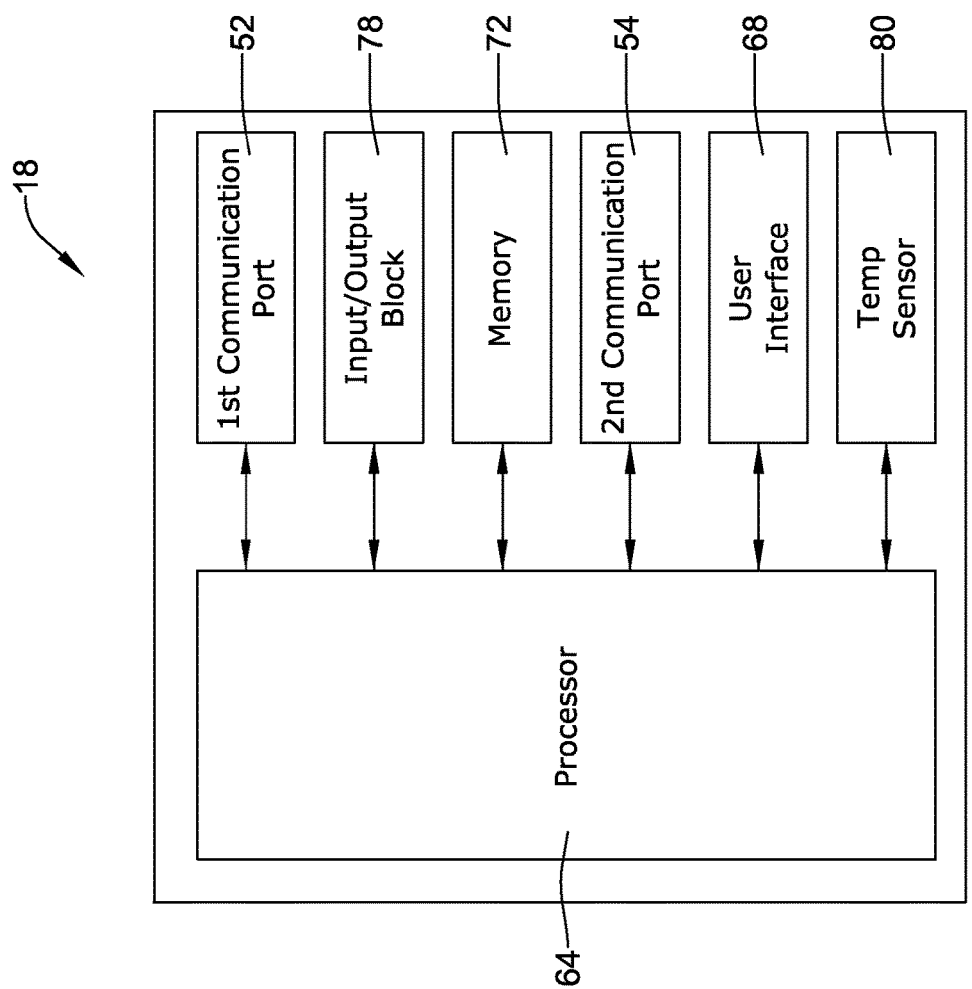
FIG. 3 is a schematic block diagram of an illustrative HVAC controller.

FIG. 3 is a schematic view of an illustrative HVAC controller 18 that may be accessed and/or controlled from a remote location over the first network 54 and/or the second network 58 (FIG. 2) using a mobile wireless device 62 such as, for example, a smart phone, a PDA, a tablet computer, a laptop or personal computer, an e-Reader, and/or the like. In some instances, the HVAC controller 18 may be a thermostat, but this is not required. In the example shown in FIGS. 2 and 3, the HVAC controller 18 may include a first communications port 52 for communicating over a first network (e.g. wireless LAN) and a second communications port 56 for communicating over a second network (e.g. WAN or the Internet). The first communications port 52 can be a wireless communications port including a wireless transceiver for wirelessly sending and/or receiving signals over a first wireless network 54. Similarly, the second communications port 56 may be a wireless communications port including a wireless transceiver for sending and/or receiving signals over a second wireless network 58. In some cases, the second communications port 56 may be in communication with a wired or wireless router or gateway for connecting to the second network, but this is not required. In some cases, the router or gateway may be integral to the HVAC controller 18 or may be provided as a separate device. Additionally, the illustrative HVAC controller 18 may include a processor (e.g. microprocessor, microcontroller, etc.) 64 and a memory 72. The HVAC controller 18 may also include a user interface 68, but this is not required.

In some cases, HVAC controller 18 may include a timer (not shown). The timer may be integral to the processor 64 or may be provided as a separate component. The HVAC controller 18 may also optionally include an input/output block (I/O block) 78 for receiving one or more signals from the HVAC system 4 and/or for providing one or more control signals to the HVAC system 4. For example, the I/O block 78 may communicate with one or more HVAC components 6 of the HVAC system 4. Alternatively, or in addition to, the I/O block 78 may communicate with another controller, which is in communication with one or more HVAC components of the HVAC system 4, such as a zone control panel in a zoned HVAC system, equipment interface module (EIM) (e.g. EIM 34 shown in FIG. 1) or any other suitable building control device.

The HVAC controller 18 may also include an internal temperature sensor 80, but this is not required. In some cases, the HVAC controller 18 may communicate with one or more remote temperature sensors, humidity sensors, and/or occupancy sensors located throughout the building or structure. The HVAC controller may communicate with a temperature sensor and/or humidity sensor located outside of the building or structure for sensing an outdoor temperature and/or humidity if desired.

The processor 64 may operate in accordance with an algorithm that controls or at least partially controls one or more HVAC components of an HVAC system such as, for example, HVAC system 4 shown in FIG. 1. The processor 64, for example, may operate in accordance with a control algorithm that provides temperature set point changes, humidity set point changes, schedule changes, start and end time changes, window frost protection setting changes, operating mode changes, and/or the like. At least a portion of the control algorithm may be stored locally in the memory 72 of the HVAC controller 18 and, in some cases, may be received from an external web service over the second network. The control algorithm (or portion thereof) stored locally in the memory 72 of the HVAC controller 18 may be periodically updated in accordance with a predetermined schedule (e.g. once every 24 hours, 48 hours, 72 hours, weekly, monthly, etc.), updated in response to any changes to the control algorithm made by a user, and/or updated in response to a user's request. The updates to the control algorithm or portion of the control algorithm stored in the memory 72 may be received from an external web service over the second network. In some cases, the control algorithm may include settings such as set points.

In some cases, the processor 64 may operate according to a first operating mode having a first temperature set point, a second operating mode having a second temperature set point, a third operating mode having a third temperature set point, and/or the like. In some cases, the first operating mode may correspond to an occupied mode and the second operating mode may correspond to an unoccupied mode. In some cases, the third operating mode may correspond to a holiday or vacation mode wherein the building or structure in which the HVAC system 4 is located may be unoccupied for an extended period of time. In other cases, the third operating mode may correspond to a sleep mode wherein the building occupants are either asleep or inactive for a period of time. These are just some examples. It will be understood that the processor 64 may be capable of operating in additional modes as necessary or desired. The number of operating modes and the operating parameter settings associated with each of the operating modes may be established locally through a user interface, and/or through an external web service and delivered to the HVAC controller via the second network 58 where they may be stored in the memory 72 for reference by the processor 64.

In some cases, the processor 64 may operate according to one or more predetermined operating parameter settings associated with a user profile for an individual user. The user profile may be stored in the memory 72 of the HVAC controller 18 and/or may be hosted by an external web service and stored on an external web server. The user profile may include one or more user-selected settings for one or more operating modes that may be designated by the user. For example, the processor 64 may operate according to a first operating mode having a first temperature set point associated with a first user profile, a second operating mode having a second temperature set point associated with the first user profile, a third operating mode having a third temperature set point associated with the first user profile, and/or the like. In some cases, the first operating mode may correspond to an occupied mode, the second operating mode may correspond to an unoccupied mode, and the third operating mode may correspond to a vacation or extended away mode wherein the building or structure in which the HVAC system 4 is located may be unoccupied for an extended period of time. In some cases, multiple user profiles may be associated with the HVAC controller 18. In certain cases where two or more user profiles are associated with the HVAC controller 18, the processor 64 may be programmed to include a set of rules for determining which individual user profile takes precedence for controlling the HVAC system when both user profiles are active.

In the illustrative embodiment of FIG. 3, the user interface 68, when provided, may be any suitable user interface that permits the HVAC controller 18 to display and/or solicit information, as well as accept one or more user interactions with the HVAC controller 18. For example, the user interface 68 may permit a user to locally enter data such as temperature set points, humidity set points, starting times, ending times, schedule times, diagnostic limits, responses to alerts, and the like. In one embodiment, the user interface 68 may be a physical user interface that is accessible at the HVAC controller 18, and may include a display and/or a distinct keypad. The display may be any suitable display. In some instances, a display may include or may be a liquid crystal display (LCD), and in some cases a fixed segment display or a dot matrix LCD display. In other cases, the user interface 68 may be a touch screen LCD panel that functions as both display and keypad. The touch screen LCD panel may be adapted to solicit values for a number of operating parameters and/or to receive such values, but this is not required. In still other cases, the user interface 68 may be a dynamic graphical user interface.

In some instances, the user interface 68 need not be physically accessible to a user at the HVAC controller 18. Instead, the user interface 68 may be a virtual user interface 68 that is accessible via the first network 54 and/or second network 58 using a mobile wireless device such as one of those wireless devices 62 previously described herein. In some cases, the virtual user interface 68 may include one or more web pages that are broadcasted over the first network 54 (e.g. LAN) by an internal web server implemented by the processor 64. When so provided, the virtual user interface 68 may be accessed over the first network 54 using a mobile wireless device 62 such as any one of those listed above. Through the one or more web pages, the processor 64 may be configured to display information relevant to the current operating status of the HVAC system 4 including the current operating mode, temperature set point, actual temperature within the building, outside temperature, outside humidity and/or the like. Additionally, the processor 64 may be configured to receive and accept any user inputs entered via the virtual user interface 68 including temperature set points, humidity set points, starting times, ending times, schedule times, window frost protection settings, diagnostic limits, responses to alerts, and the like.

In other cases, the virtual user interface 68 may include one or more web pages that are broadcasted over the second network 58 (e.g. WAN or the Internet) by an external web server (e.g. web server 66). The one or more web pages forming the virtual user interface 68 may be hosted by an external web service and associated with a user account having one or more user profiles. The external web server 66 may receive and accept any user inputs entered via the virtual user interface and associate the user inputs with a user's account on the external web service. If the user inputs include any changes to the existing control algorithm including any temperature set point changes, humidity set point changes, schedule changes, start and end time changes, window frost protection setting changes, operating mode changes, and/or changes to a user's profile, the external web server may update the control algorithm, as applicable, and transmit at least a portion of the updated control algorithm over the second network 58 to the HVAC controller 18 where it is received via the second port 56 and may be stored in the memory 72 for execution by the processor 64.

The memory 72 of the illustrative HVAC controller 18 may be in communication with the processor 64. The memory 72 may be used to store any desired information, such as the aforementioned control algorithm, set points, schedule times, diagnostic limits such as, for example, differential pressure limits, delta T limits, and the like. The memory 72 may be any suitable type of storage device including, but not limited to, RAM, ROM, EPROM, flash memory, a hard drive, and/or the like. In some cases, the processor 64 may store information within the memory 72, and may subsequently retrieve the stored information from the memory 72.

Referring back generally to FIG. 2, any number of wired or wireless devices, including the HVAC controller 18 and a user's mobile wireless device 62, may be connected to and enrolled in a building's wireless local area network 54. In some cases, the HVAC controller 18 may be configured to execute a program code stored in the memory 72 for connecting to and enrolling with the wireless local area network 54 of the building in which it is located. Each device may be assigned a unique identifier (e.g. IP address) upon enrollment with the wireless local area network. The unique identifier may be assigned by a router or other gateway device. The router or gateway device may store a local cache containing a list of unique identifiers (e.g. IP addresses) for each of the devices connected to the wireless local area network. The router or gateway can be a separate device from the HVAC controller 18, but this is not required. In some cases, a MAC address or MAC CRC address provided by the device being enrolled in the wireless local area network host upon connection of the device to the network may be used to uniquely identify the device on the wireless local area network 54 and/or wireless network 58. The unique identifier may be used to identify and recognize each device on the network 54 each time the device is connected to the wireless local area network 54 and/or wireless network 58.

Figure 4:
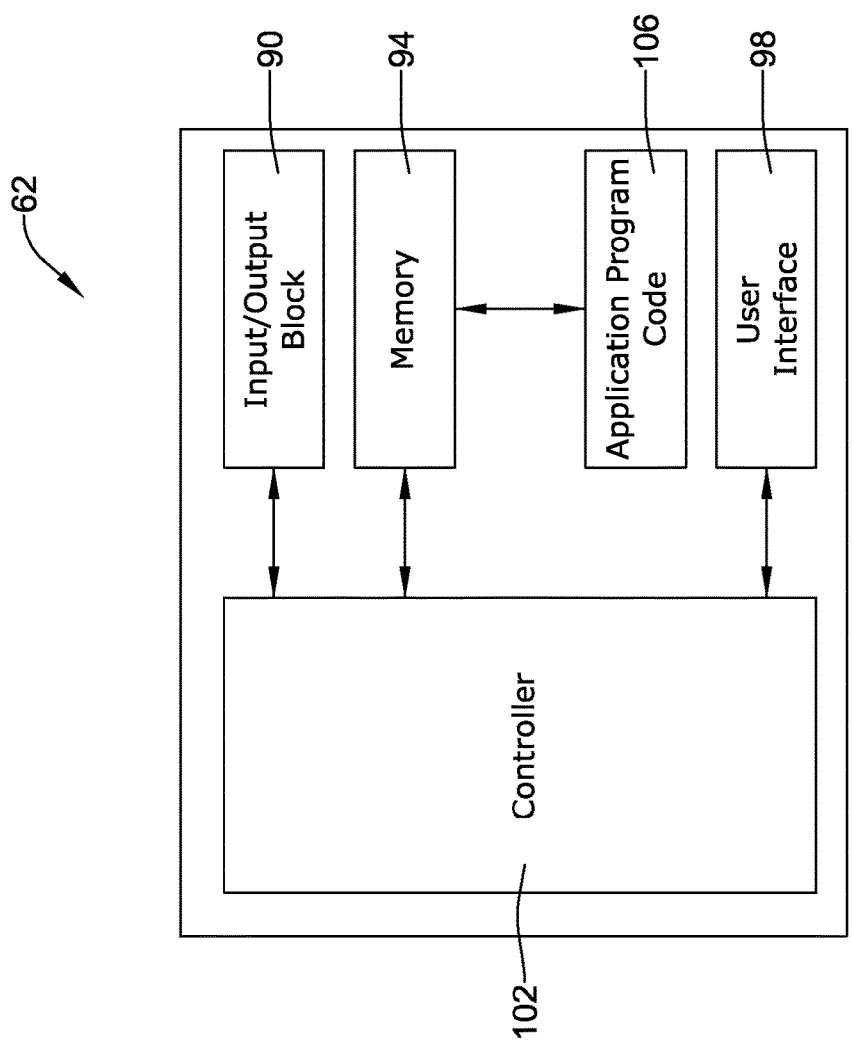
FIG. 4 is a schematic block diagram of an illustrative wireless device that may be used to communicate with and/or control the illustrative HVAC controller of FIG. 3.

FIG. 4 is a schematic block diagram of a wireless device 62 that may be used to communicate with and control one or more HVAC controllers 18 located within a building or structure 2. The wireless device 62 may be, for example, any one of the devices described herein. In some instances, the wireless device 62 may be a smartphone or a tablet computer, but this is not required. As discussed above with reference to FIG. 2, the wireless device 62 may be used to communicate with and/or controller one or more HVAC controllers 18 located within the building or structure 2 via the first network 54 and/or second network 58 depending upon the application. In some cases, as described herein, the wireless device 62 may be programmed to communicate over the second network 58 with an external web service hosted by one or more external web servers 66 to which the one or more HVAC controllers 18 is also connected. A non-limiting example of such an external web service is Honeywell's TOTAL CONNECT™ web service. Communication and data may be transmitted between the wireless device 62 and the one or more HVAC controllers 18 via the external web service.

As shown in FIG. 4, the wireless device 62 can include at least one wireless input/output port 90 for wirelessly sending and/or receiving data over the first and/or second network 54, 58 to and from the one or more HVAC controllers 18 located within the building 2. Additionally, the wireless device 62 can include a memory 94, a user interface 98 including a display, and a controller 102 (e.g. microprocessor, microcontroller, etc.) coupled to the input/output port 90, the memory 94, and the user interface 98. In some instances, one or more application program codes 106 (sometimes referred to as apps) may be stored in the memory 94 for execution by the controller 102. The one or more application program codes 106 may be purchased and downloaded from an external web service such as, for example, Apple, Inc.'s ITUNES™, Google Inc.'s Google Play, Honeywell's TOTAL CONNECT™ web service, a contractor's web site, and/or any other suitable location. In one instance, at least one of the application program codes 106 stored in the memory 94 may relate to controlling an HVAC system 4.

Figure 5:
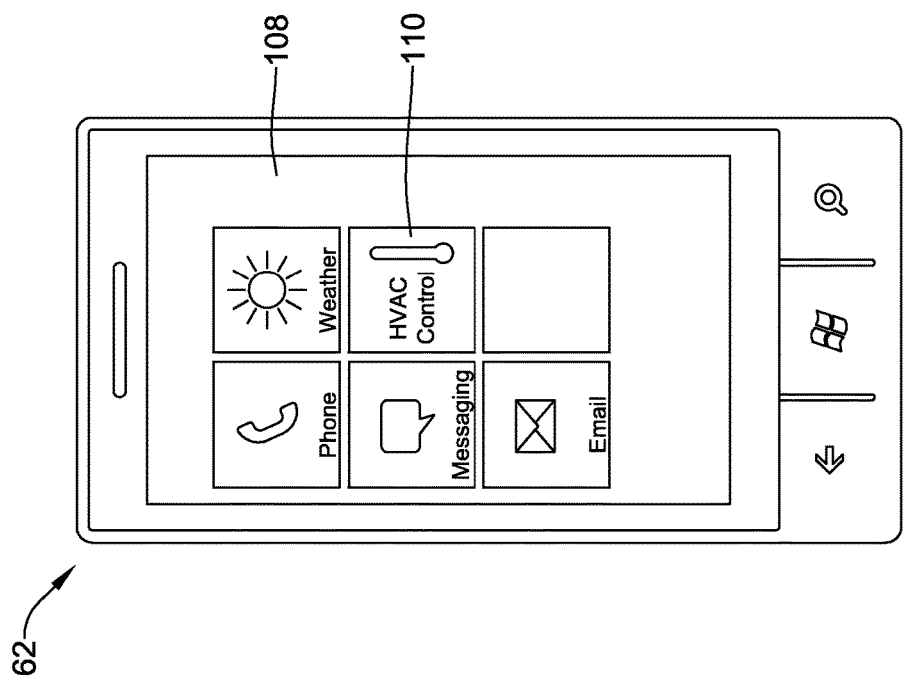
FIGS. 5-8B show illustrative screens that may be displayed on the user interface of the wireless device used to access and/or control the HVAC system of FIG. 1.

FIGS. 5-8B provide illustrative screens that include at least one icon 110 related to controlling an HVAC system 4 that may be displayed on the user interface 98 of an illustrative wireless device 62. As shown in FIG. 5, at least one application program code 106 stored in the memory 94 may cause the controller 102 to display at least one icon 110 related to controlling an HVAC system 4 on the display 108 of the wireless device 62. The icon 110, when selected by a user, may further cause the controller 102 to execute an application program code 106 for communicating with and/or controlling one or more components 6 of an HVAC system 4 located within the building. Upon selection of the icon 110, and as shown in FIG. 6A, the application program code 106 may cause the controller 102 to display additional icons 112, 114, 116, 118, 120, and/or 124 on the display 108, each icon 112, 114, 116, 118, 120, and 124 related to a unique function that, when selected, aids a user in controlling one or more HVAC components 6 of the HVAC system 4. In some cases, the unique function of each of the icons 112, 114, 116, 118, 120, and 124 may include displaying information received from the HVAC system 4 via the input/output port 90 and/or sending one or more commands to control the HVAC system 4 via the input/output port 90. In one example, and as shown in FIG. 6A, a first icon 112 may display current indoor temperature information for one or more locations inside the building 2, a second icon 114 may display one or more alerts related to the operation of the HVAC system 4, a third icon 116 may display current humidity information, and a fourth icon 118 may display the current outdoor air temperature. In some cases, the control and operation of a building's HVAC system 4 may be integrated with the control and operation of a building's security system. In this example, the application program code 106 may also cause the controller 102 to display additional information regarding the status of any features of the building's security system. For example, as shown in the example provided in FIG. 6A, the application program code 106 may cause the controller 102 to display a fifth icon 120 relating to a door status of the building 2. These are just some examples.

Figure 6A:
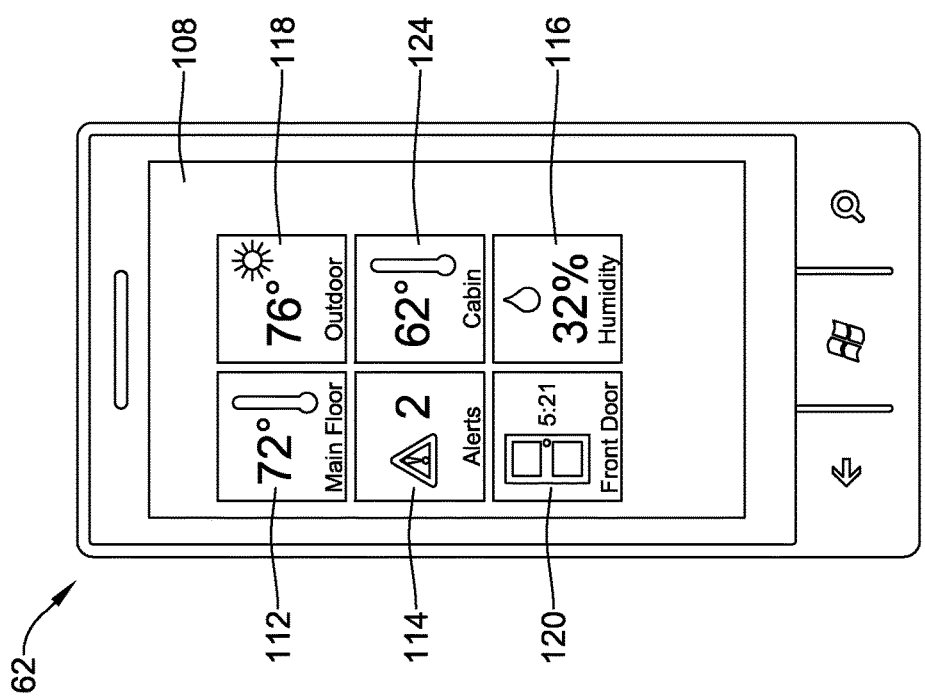
Figure 7:
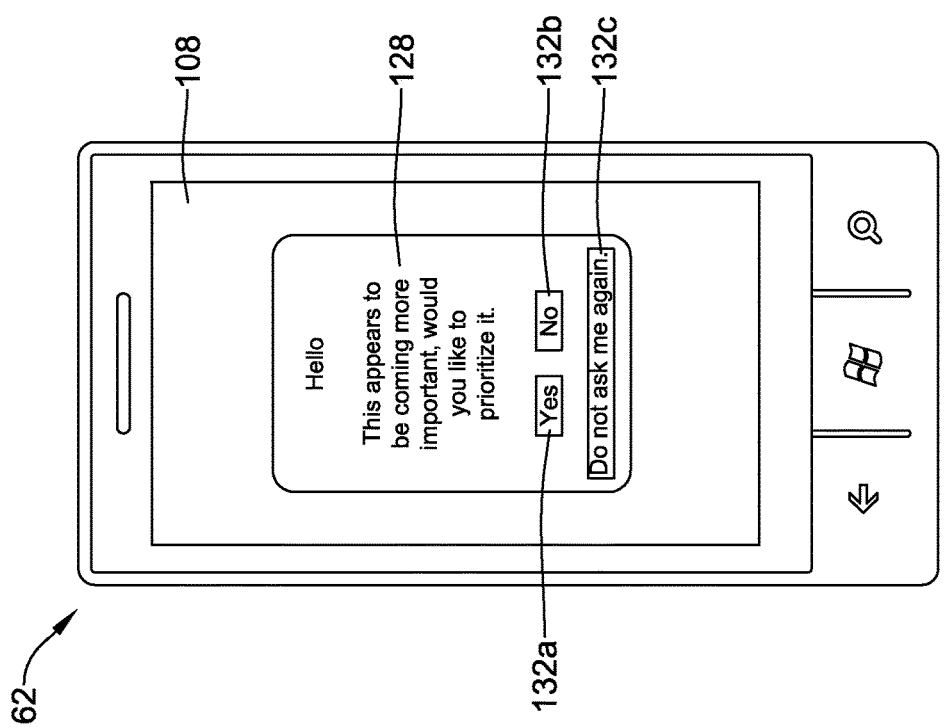
Figure 8A:
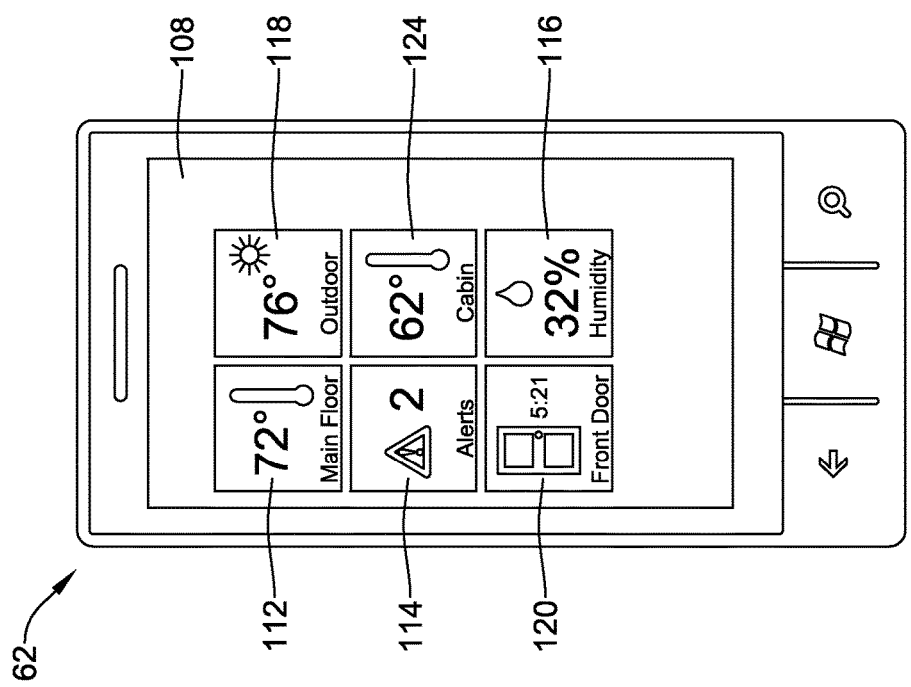

In some cases, the application program code 106 may facilitate control of one or more HVAC components 6 of an HVAC system 4 located in at least one addition building that is maintained by the user such as, for example, a rental property, an office, a cabin, and/or a vacation home, but not limited to these. In this case, the application program code 106 may cause the controller 102 to display at least one additional icon 124 related to the HVAC system 4 and/or security system located within the additional building or structure. For example, as shown in FIG. 6A, the application program code 106 may cause the controller 102 to display an additional icon 124 that may display the current indoor air temperature of the user's cabin. It will be generally understood that additional icons relating to similar and/or different functions for displaying information from and/or controlling one or more HVAC components 6 of an HVAC system located within one or more buildings associated with the user may be displayed on the display 108 of the user's wireless device 62 and that depending on the features of the user's HVAC system(s) 4, the number and function associated with each of the icons may differ for each individual user.

In cases where two or more icons 112, 114, 116, 118, 120, and/or 124 are displayed on the display 108 of the wireless device 62, the controller 102 may be configured to dynamically order the two or more icons 112, 114, 116, 118, 120, and/or 124 on the display 108 according to a dynamic ranking algorithm. In some cases, the dynamic ranking algorithm may be stored in the memory 94 of the wireless device 62 and, in some cases, may be integrated into the application program code 106 that causes the controller 102 to display one or more icons (e.g. icons 112, 114, 116, 118, 120, and/or 124) relating to controlling the HVAC system 4, as described herein. In other cases, the dynamic ranking algorithm may form at least a portion of an additional program code stored in the memory 94 of the wireless device, but this is not required. The dynamic ranking algorithm may cause the controller 102 to learn how the user interacts with the icons 112, 114, 116, 118, 120 and/or 124 on the display 108, and may cause the controller 102 to arrange and display the one or more icons 112, 114, 116, 118, 120, and/or 124 on the display 108 based, at least in part, on the user's interactions with the one or more icons 112, 114, 116, 118, 120, and/or 124. For example, as shown in FIG. 6A, where there are two or more icons 112, 114, 116, 118, 120, and/or 124, the controller 102 may be configured to display the two or more icons 112, 114, 116, 118, 120, and/or 124 in a grid pattern on the display 108, wherein icons 112, 114, 116, 118, 120, and/or 124 with a higher rank are displayed at a higher location in the grid pattern and icons 112, 114, 116, 118, 120, and/or 124 having a lower rank are displayed at a lower location in the grid pattern. The dynamic ranking algorithm may be based on one or more factors including, but not limited to: a relative frequency of selection of each of two or more icons by a user; a current time of day, where the controller 102 may maintain the current time of day; a current time of the year, where the controller 102 may maintain a current time of the year; on a current temperature, where the controller 102 may receive a current temperature via the input/output port 90; a measure related to a temperature history stored in the memory of the wireless device 62; a current humidity, where the controller 102 may receive a current humidity via the input/output port 90, a current operating mode of the HVAC system (e.g. heat, cool mode); what HVAC equipment is currently active (e.g. furnace, compressor, humidifier); a current location of the wireless device 62 relative to the HVAC system 4 where the wireless device 62 may include a location detector that dynamically provides and updates a current location of the wireless device 62; and/or any other suitable factor as desired. These are just some examples. In many cases, the user may "drag and drop" one or more of the icons 112, 114, 116, 118, 120, and/or 124 displayed on the display 108 to a desired location on the display 108. In some cases, the user may "hide" one or more icons 112, 114, 116, 118, 120, and/or 124 from view on the display 108 of the wireless device 62.

As indicate above, the dynamic ranking algorithm may be based, at least in part, on a relative frequency of selection of each of two or more icons 112, 114, 116, 118, 120, and/or 124 displayed on the display 108 of the wireless device 62 by a user. For example, each time that one of the icons 112, 114, 116, 118, 120, and/or 124 is selected by a user, the dynamic ranking algorithm may cause the controller 102 to assign a score to the selected icon 112, 114, 116, 118, 120, and/or 124 based, at least in part, the number of times the icon 112, 114, 116, 118, 120, and/or 124 has been selected by a user, sometimes over a predetermine time period. The controller 102 may rank and/or re-order the icons on the display based on the assigned score. In some cases, at least one or the icons 112, 114, 116, 118, 120, and/or 124 may be assigned a weight and may receive a weighted score. For example, the icon 112 displaying a current temperature may be assigned a higher relative weight than the icon 116 displaying the outdoor temperature. Even though each icon 112 or 116 may be selected the same approximate number of times, the higher relative weight assigned to the icon 112 may cause the controller 102 to assign a higher rank to the icon 112 and thus, display the icon 112 more prominently (e.g. toward the top, larger in size, different color) on the display 108.

In one instance, the controller 102 may display the higher ranked icons, such as icon 112, in a top portion of the display 108. In other instances, the controller 102 may highlight, enlarge, or otherwise visually enhance the higher ranked icon 112 on the display 108 of the device. In other cases, the controller 102 may be configured to not display at least one icon 112, 114, 116, 118, 120 and/or 124 on the display when the rank of the icon(s) falls below a threshold rank (e.g. the frequency of selection for the at least one icon 112, 114, 116, 118, 120, and/or 124 does not meet a predetermined criteria). In one example, if a user seldom or never selects the icon 116 displaying a current indoor humidity, the controller 102 may no longer display the icon 116 on the display 108 of the wireless device 62. This may help reduce clutter on the display 108 and provide more room for icons that are used by the user of the wireless device 62.

In some cases, selection of certain icons such as, for example, icon 112 related to an indoor temperature for one or more locations within the building 2 may cause the controller 102 to display additional icons relating to the unique function of the selected icon 112. For example, as shown in FIG. 6B, selection of icon 112 may cause the controller 102 to display icons 212, 214 on the display 108 for adjusting a heating temperature setpoint and a cooling temperature setpoint, respectively. In some cases, each icon 212 and 214 may include first and second arrows 216a, 216b and 218a, 218b for adjusting the temperature setpoint for both heating and cooling. In some cases, the controller 102 may be configured to arrange and/or display the icons 212, 214 on the display 108 according to a dynamic ranking algorithm, as described herein. In other cases, the controller 102 may be configured to arrange and/or display the icons 212, 214 based upon which mode (e.g. heating or cooling) is currently operating. For example, if the cooling mode is currently operating, the controller 102 may display icon 214 for adjusting the cooling setpoint in a top portion of the display 108 and/or may display icon 214 more prominently relative to icon 212 for adjusting the heating setpoint. In addition or in alternative to, the controller 102 may highlight, enlarge, or otherwise visually enhance icon 214 relative to icon 212 on the display 108 of the device. Similarly, if the heating mode is currently operating, the controller 102 may be configured to display icon 212 in a top portion of the display 108 and/or may display icon 212 more prominently relative to the icon 214 for adjusting the cooling setpoint. In some instances, if one mode is operating (e.g. heating) and the other mode (e.g. cooling) is dormant, the controller 102 may be configured to only display icon (e.g. icon 212) for adjusting the appropriate setpoint. Selection of icon 220 labeled "Done" or "OK" may cause the controller 102 to display the previous screen as shown in FIG. 6A.

In some instances, the application program code 106 may further cause the controller 102 to query a user regarding the frequency of their icon selections. For example, as shown in the illustrative example provided in FIG. 7, the controller 102 may be programmed to display a user message 128 on the display 108 that queries the user about prioritizing the selected icon 112, 114, 116, 118, 120, and/or 124. The controller 102 may display a user message 128 after one or more icons 112, 114, 116, 118, 120, and/or 124 have been selected by a user a predetermined number of times. The controller 102 may also display at least one selectable option 132a, 132b, and/or 132c for responding to the user message 128 displayed on the display 108. In one instance, the controller 102 may display a first selectable option 132a labeled "Yes" and a second option 132b labeled "No". Selection of the first selectable option 132a by a user may indicate to the controller 102 that the selected icon 112, 114, 116, 118, 120, and/or 124 should be prioritized. Selection of the second selectable option 132b indicates that the user's frequency of selection of the selected icon 112, 114, 116, 118, 120, and/or 124 should not be prioritized. In certain cases, the controller 102 may also display a third selectable option 132c labeled "Do Not Ask Me Again" which may disable this query feature of the application program code 106.

In some cases, the wireless device 62 may include a location detector, such as a global positioning system, for detecting a current location of the wireless device 62. The controller 102 may be configured to detect a location of the wireless device 62, and may re-order or rearrange one or more of the icons 112, 114, 116, 118, 120, and/or 124 on the display 108 of the wireless device 62 in response to the detected location of the wireless device 62. For example, as shown in the illustrative examples provided by FIGS. 8A and 8B, the controller 102 may rearrange the icons 112, 114, 116, 118, 120, and/or 124 such that the icon 124 associated with controlling the temperature in the user's cabin is located higher in the grid pattern, and the icon 112 for controlling the temperature in the user's home is lower in the grid pattern, when the wireless device 62 detects that the user is closer in proximity to the user's cabin rather than the user's main residence.

In some cases, the user's mobile wireless device 62 may be programmed to transmit one or more commands to the HVAC controller 18 after comparing its current location to geographical information previously stored in the memory of the mobile wireless device 62, and determining that the comparison meets (or does not meet) predetermined criteria. Such geographical information may be relevant to a user's location and may include geographical data indicating the location of the user's residence, business, or other location. In some cases, the geographical information may include a predefined proximity zone defined relative to the location of the user's residence in which the HVAC controller 18 is located. The predefined proximity zone may have at least one outer boundary. In some cases, the predefined proximity zone may have a number of outer boundaries. The outer boundaries of the predefined proximity zone may be established at a distance away from the user's residence and may define any number of shapes. In some cases, the outer boundaries of the predetermined proximity zone may be defined by a radius extending away from the user's residence by a distance of about 5 miles, 10 miles, 15 miles, 25 miles, etc. In other cases, the outer boundaries of the predefined proximity zone may correspond to a geographical region such as for example, the geographical boundaries of the city, zip code region, or county in which the user's residence is located.

In some cases, the geographical information may include at least one established route typically followed by the user of the mobile wireless device 62 between a first location (e.g. the user's home) and at least one other location (e.g. work, cabin). In some cases, as described above, the application program code stored in the memory 94 of the of the user's mobile wireless device 62 may cause the controller 102 of the user's mobile wireless device 62 to monitor a current location of the user's mobile wireless device 62 using the locating device, and compare the current location of the user's mobile wireless device 62 with geographical information stored in the memory 94 of the mobile wireless device 62.

Referring back to FIGS. 6A and 6B, in some instances, the wireless device 62 may be programmed to re-order or rearrange two or more icons 112, 114, 116, 118, 120, and/or 124 on the display 108 of the wireless device 62 based, at least in part, on a measure related to a temperature history such as, for example, an outdoor temperature and/or outdoor humidity, but not limited to these. The temperature history may be stored in the memory 94 of the wireless device 62 or may be delivered to the wireless device 62 via the input/output port 90. In some cases, the temperature history may be indicative of seasonal temperature trends as the seasons change from fall to winter to spring to summer. For example, if the temperature history stored in the memory 94 of the wireless device 62 indicates a seasonal trend towards cooler temperatures (e.g. fall or winter), the controller 102 may arrange the one or more icons 112, 114, 116, 118, 120, and/or 124 on the display 108 such that the first icon 112 relating to controlling a thermostat is displayed at or near a top of the grid pattern on the display 108. In this case, the first icon 112 relating to controlling a thermostat may be related to controlling one or more heating components of the HVAC system 4. Similarly, if humidity control is a feature of the HVAC system 4 during warmer seasonal trends (e.g. summer), the controller 102 may re-order and/or rearrange the icons 112, 114, 116, 118, 120, and/or 124 on the display 108 of the wireless device 62 such that the third icon 116 relating to controlling an indoor humidity is displayed at or near a top of the grid pattern on the display 108.

In some cases, the controller 102 may be configured to re-order and/or re-arrange two or more icons 112, 114, 116, 118, 120, and/or 124 on the display 108 of the wireless device 62 based, at least in part, on an outdoor temperature. In some instances, the wireless device 62 may include a temperature sensor configured to detect the outdoor temperature. In other instances, the wireless device 62 may receive a measure indicative of the outdoor temperature via the input/output port 90 from an outdoor temperature sensor associated with the building 2 in which the HVAC system 4 is located, or from a web-site or other location.

In some cases, the controller 102 may be configured to re-order and/or re-arrange two or more icons 112, 114, 116, 118, 120, and/or 124 on the display 108 of the wireless device 62 based, at least in part, on a current humidity. In some instances, the wireless device 62 may include a humidity sensor configured to detect a current indoor and/or outdoor humidity. In other instances, the wireless device 62 may receive a measure indicative of the current humidity via the input/output port 90 from an outdoor temperature sensor associated with the building 2 in which the HVAC system 4 is located, or from a web-site or other location.

Figure 9:
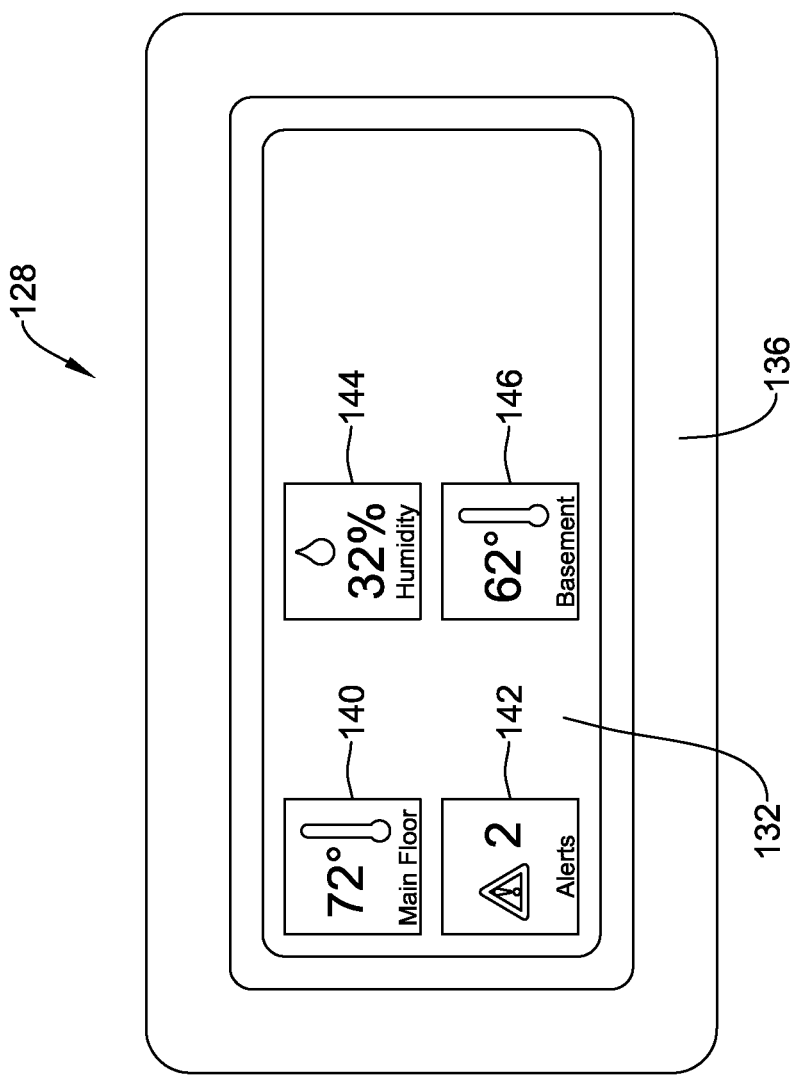
FIG. 9 is a front view of an illustrative HVAC controller that may be used to control the HVAC system of FIG. 1.

While the various embodiments described above relate to a wireless device, it will be generally understood by those skill in the art that an HVAC controller may be configured to execute many of the same functions related to arranging and displaying two or more icons on a display as described herein. FIG. 9 is a front view of an illustrative HVAC controller 118. The HVAC controller 118 may be a wireless HVAC controller, but this is not required. In some cases, the HVAC controller 118 is a thermostat. In the illustrative embodiment of FIG. 9, the HVAC controller 128 may include a display 132 that is disposed within a housing 136 but viewable externally from the housing 136. In some cases, the display 132 may be a touch sensitive LCD display. As shown in FIG. 9, the HVAC controller 118 may be configured to display one or more icons 140, 142, 144, 146 on the display 132. In some cases, the HVAC controller 128 may be programmed to arrange and display the one or more icons 140, 142, 144, 146 according to a dynamic ranking algorithm, as described herein according to the various embodiments, stored in a memory of the HVAC controller 128.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A portable wireless device configured to communicate with and help control one or more HVAC components of an HVAC system of a building, the portable wireless device comprising:
   a wireless interface for sending and receiving information;
   a memory:
   a user interface including a display;
   a location detector that provides a current location of the portable wireless device, wherein the current location of the portable wireless device changes with movement of the portable wireless device; and
   a controller coupled to the wireless interface, the memory, the user interface and the location detector, the controller configured to display two or more selectable icons on the display, wherein each of the two or more icons, when selected by a user, executes a unique function that aids the user in controlling the one or more HVAC components of the HVAC system, the unique function of each of the two or more icons includes displaying information received via the wireless interface and/or sending one or more commands to control the HVAC system via the wireless interface, the controller further configured to dynamically order the two or more icons on the display according to a dynamic ranking algorithm, wherein the dynamic ranking algorithm is configured to dynamically order the two or more icons on the display based, at least in part, on the current location of the portable wireless device provided by the location detector, wherein the current location of the portable wireless device is updated for each time the dynamic ranking algorithm orders the two or more icons on the display based, at least in part, on the current location of the portable wireless device.

2. The portable wireless device of claim 1, wherein the controller maintains a current time of day, and wherein the dynamic ranking algorithm is based, at least in part, on the current time of day.

3. The portable wireless device of claim 1, wherein the controller maintains a current time of year, and wherein the dynamic ranking algorithm is based, at least in part, on the current time of year.

4. The portable wireless device of claim 1, wherein the controller receives a current temperature via the wireless interface, and wherein the dynamic ranking algorithm is based, at least in part, on the current temperature.

5. The portable wireless device of claim 1, wherein the portable wireless device includes a temperature sensor for providing a current temperature to the controller, and wherein the dynamic ranking algorithm is based, at least in part, on the current temperature.

6. The portable wireless device of claim 1, wherein the portable wireless device stores a temperature history in the memory, and wherein the dynamic ranking algorithm is based, at least in part, on the temperature history.

7. The portable wireless device of claim 1, wherein the controller receives a current humidity via the wireless interface, and wherein the dynamic ranking algorithm is based, at least in part, on the current humidity.

8. The portable wireless device of claim 1, wherein the portable wireless device includes a humidity sensor for providing a current humidity to the controller, and wherein the dynamic ranking algorithm is based, at least in part, on the current humidity.

9. The portable wireless device of claim 1, wherein the controller is further configured to not display at least one icon on the display when a frequency of selection for the at least one icon does not meet a predetermined criteria.

10. The portable wireless device of claim 1, wherein each of the unique functions represented by the two or more icons are assigned a weight, and wherein the dynamic ranking algorithm dynamically orders the two or more icons on the display based, at least in part, on the assigned weights.

11. The portable wireless device of claim 1, wherein the controller is configured to display the two or more icons in a grid pattern on the display, and wherein icons with a higher rank are displayed higher in the grid pattern and icons having a lower rank are displayed lower in the grid pattern.

12. The portable wireless device of claim 1, wherein the controller is further configured to dynamically change an appearance of at least some of the two or more icons on the display according to the dynamic ranking algorithm.

13. The portable wireless device of claim 1, wherein the portable wireless device is a wireless thermostat including a temperature sensor.

14. The portable wireless device of claim 1, wherein the portable wireless device is any one of a remote controller, a mobile phone, a tablet computer, or a laptop computer.

15. A computer readable medium having stored thereon in a non-transitory state a program code for use by a portable wireless device connectable to a network, the program code causing the portable wireless device to execute a method for controlling an HVAC system comprising:

displaying two or more selectable icons on a display of the portable wireless device, wherein at least two icons, when selected by a user, each execute a unique function that aids the user in controlling the HVAC system;

allowing a user to select from the two or more selectable icons;

causing the portable wireless device to execute the unique function associated with the selectable icon selected by the user, wherein the unique function includes displaying information received from the HVAC system via a wireless interface of the portable wireless device and/or sending one or more commands to control the HVAC system via the wireless interface of the portable wireless device;

updating a current location of the portable wireless device provided by a location detector in the portable wireless device, wherein the current location of the portable wireless device changes with movement of the portable wireless device; and dynamically ordering the two or more icons on the display according to a dynamic ranking algorithm, wherein the dynamic ranking algorithm is configured to dynamically order the two or more icons on the display based, at least in part, on the current location of the wireless device, wherein the current location of the portable wireless device is updated each time the two or more icons are dynamically ordered based, at least in part, on the current location of the portable wireless device.

16. The computer readable medium of claim 15, wherein the dynamic ranking algorithm is based, at least in part, on a relative frequency of selection of each of the two or more icons by a user.

17. The computer readable medium of claim 15, wherein the dynamic ranking algorithm is based, at least in part, on a current time of day and/or current time of year maintained by the portable wireless device.

18. The computer readable medium of claim 15, wherein the dynamic ranking algorithm is based, at least in part, on a temperature history received via the wireless interface of the portable wireless device.

* * * * *